3,354,163
N-DESMETHYLVINBLASTINE
Marvin Gorman, Indianapolis, Ind., assignor to Eli Lilly and Company, Indianapolis, Ind., a corporation of Indiana
No Drawing. Filed Dec. 15, 1966, Ser. No. 601,858
4 Claims. (Cl. 260—287)

ABSTRACT OF THE DISCLOSURE

The preparation from known alkaloids having activity against Hodgkins disease, choriocarcinoma, and leukemia, of N-desmethylvinblastine by the oxidation of vinblastine with peroxidase and hydrogen peroxide or by heating vincristine in solution at pH 1–3. The N-desmethylvinblastine is useful for converting vinblastine to vincristine or vice versa and for preparing homologs of both.

---

The present application is a continuation-in-part of my copending application Ser. No. 354,420, filed Mar. 24, 1964, now abandoned, which was a continuation-in-part of my application Ser. No. 233,917, filed Oct. 29, 1962, now abandoned.

The present invention relates to dimeric alkaloids. More particularly, it relates to alkaloids of the vinblastine ring structure and to an intermediate useful in the preparation thereof.

It is now well known that useful agents are obtainable from the plant *Vinca rosea*. Specifically, vinblastine has proved to be useful in the control of Hodgkins disease and of choriocarcinoma. More recently, vincristine, also known as leurocristine, has been found to produce remissions in certain forms of leukemia. These compounds are marketed under the trademarks Velban and Oncovin, respectively, and have structures represented by the following formula:

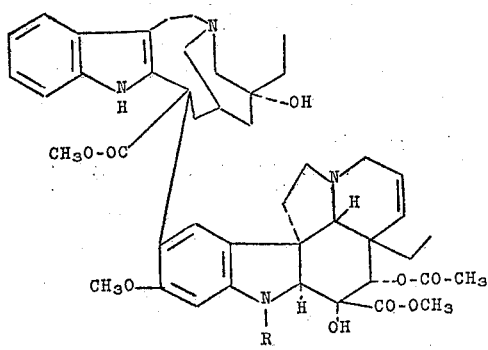

wherein R represents methyl in the case of vinblastine and formyl in the case of vincristine. The structures of these compounds are known and have been reported in the literature. [Structure of Leurocristine Methiodide Dihydrate by Anomalous Scattering Method; Relation to Leurocristine (Vincristine) and Vincaleukoblastine (Vinblastine), Moncrief et al., Acta Cryst. 21, 322 (1966)].

In view of the fact that vinblastine and vincristine are of limited availability and have radically different antitumor spectra, it would be an advantage to be able to convert one into the other. The present invention affords means for such interconversion.

The vinblastine used as starting material in these preparations is conveniently obtained according to the procedures in Examples 1 and 2 of Beer et al., U.S. Patent 3,097,137 (July 9, 1963). The preparation of vincristine is described in U.S. Patent 3,205,220, issued Sept. 7, 1965.

In one aspect, the invention relates to an intermediate compound, N-desmethylvinblastine, of the above structural formula wherein R is hydrogen.

In another aspect, the invention relates to the conversion of vincristine into N-desmethylvinblastine by treatment under acid conditions around pH 1 to 3 at elevated temperature.

In another aspect, the invention relates to the conversion of N-desmethylvinblastine into the N-acyl analogues of vincristine and into the N-alkyl analogues of vinblastine.

In one embodiment of the invention, vincristine in the form of the free base, the sulfate salt, or other soluble derivative, is dissolved in water or aqueous acid to a concentration of around 0.1 percent by weight up to saturation. The solution is adjusted to a pH in the range of about 1 to 3 by adding acid or base as necessary, e.g., sulfuric acid, hydrochloric acid, phosphoric acid, sodium hydroxide, potassium hydroxide, or the like. The solution is then heated to an elevated temperature, preferably above about 75° C. and optimally around the reflux point, 100° C., for a time sufficient to bring about the desired N-desformylation, ordinarily ten to twenty hours. The product is recovered by extraction with a selective solvent such as a chlorinated hydrocarbon and is purified in a conventional manner by column chromatography on alumina, silica, or other adsorbent solid, employing benzene for applying the crude substance to the chromatographic system and benzene-chloroform or the like at varying ratios for elution. The preparation of N-desmethylvinblastine according to the foregoing procedure is remarkable in that it selectively removes the N-formyl group of vincristine without changing the acid and alkalilabile moieties in the molecule.

In an alternative method for the preparation of N-desmethylvinblastine, vinblastine may be subjected to N-desmethylation in a known manner, e.g., by treatment with an oxidizing agent of limited severity, effective for oxidizing the N-methyl group without destroying other labile centers in the molecule. For this purpose, the use of biological oxidizing systems comprising peroxidase and hydrogen peroxide is indicated owing to the inherent specificity of such systems.

N-desmethylvinblastine sulfate, the mono-sulfate salt of N-desmethylvinblastine, is a crystalline substance which does not melt at temperatures up to 340° C. and which has the following maxima in its ultraviolet absorption spectrum:

| $\lambda$ | $\epsilon$ |
|---|---|
| 211 m$\mu$ | 46,450 |
| 258 | 11,800 |
| 286 | 11,100 |
| 294 | 10,000 |
| 310 | 5,110 |

N-desmethylvinblastine free base is readily obtained by dissolving the sulfate salt in water, making the solution basic with aqueous sodium hydroxide, to pH 8 to 9; the organic free base is extracted with methylene chloride, the solution dried and concentrated to yield N-desmethylvinblastine as a white amorphous powder. The infrared spectrum of N-desmethylvinblastine determined in chloroform solution is described by the following wave-number values expressed in reciprocal centimeters.

| cm.$^{-1}$ | |
|---|---|
| 3460 | 1370 |
| 3440 | 1328 |
| 3000 | 1297 |
| 2956 | 1254 |
| 2940 | 1236 |
| 2930 | 1198 |
| 2870 | 1164 |
| 2830 | 1141 |
| 2790 | 1125 |
| 1735 | 1112 |
| 1617 | 1076 |
| 1598 | 1060 |
| 1497 | 1037 |
| 1485 | 1004 |
| 1457 | 988 |
| 1431 | 974 |
| 1418 | 954 |
| 1391 | 917 |

On the basis of the known structure of vinblastine and the above-accumulated information, the structure of N-desmethylvinblastine is represented by the following formula:

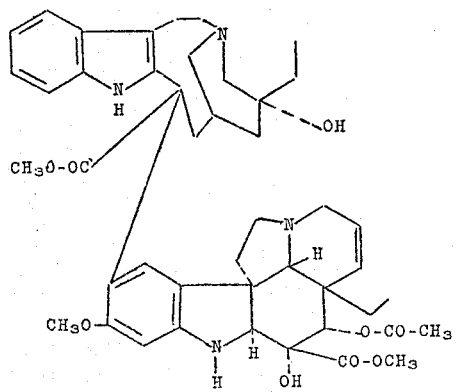

This structure is further confirmed by the fact that N-desmethylvinblastine can be reconverted to the known vinblastine or vincristine.

The primary product of the invention, N-desmethylvinblastine, has utility in a variety of settings. It is readily convertible into vincristine by treatment with a formylating agent such as a mixture of formic acid and acetic anhydride. It is readily converted into vinblastine by treatment with a methylating agent, such as aqueous formaldehyde in the presence of hydrogen and a platinum catalyst. It can thus be used for the preparation of C–14 or tritium-labeled vinblastine and vincristine for metabolic studies. It is readily convertible by treatment with acylating or alkylating agents to produce homologues of vincristine and vinblastine having modified antitumor spectra. Among such derivatives are homologues of vincristine having acetyl, propionyl, butyryl, enanthyl, palmityl, stearyl, and the like instead of (N-)formyl; and homologues of vinblastine having ethyl, n-propyl, n-butyl, isobutyl, n-amyl, isooctyl, n-decyl, hexadecyl, and the like instead of (N-)methyl.

The following examples will more clearly illustrate the invention.

*Example 1*

Vincristine sulfate (200 mg.) was dissolved in 50 ml. of aqueous 0.01 percent sulfuric acid at pH 2.03 and refluxed for 18 hours. The resulting clear solution was made alkaline with concentrated ammonium hydroxide and extracted three times with 30-ml. portions of methylene dichloride. The extracts were combined and evaporated to dryness under vacuum. The residue was taken up in 1 ml. of methylene dichloride and the solution was diluted to 30 ml. with ethyl ether. The precipitate which formed (between 5 and 10 mg.) was removed by centrifugation, and the clear supernatant liquor was evaporated to dryness under vacuum, yielding a white powder which weighed 150 mg. Analysis of the powder by thin-layer chromatography in ethanol on a silica plate showed two new spots (ratio, three parts upper to one part lower) and no residual vincristine. The components were separated by chromatography on an alumina column, being first deposited from benzene solution, then eluted with benzene-chloroform mixtures. The major fraction was eluted with 3:1 benzene-chloroform, and was found to have infrared and ultraviolet spectra consistent with the structure of N-desmethylvinblastine. The minor component appeared to be desacetyl-N-desmethylvinblastine.

When the reaction was carried out at pH levels below about 2.0, a greater percentage of the desacetyl compound was obtained, while at pH levels above about 2.5, conversion of the vincristine was incomplete.

*Example 2*

N-desmethylvinblastine (7 mg.) was dissolved in 1 ml. of acetic anhydride and allowed to stand at room temperature for 24 hours. The mixture was then diluted with 15 ml. of water, basified with ammonium hydroxide, and extracted three times with 10-ml. portions of methylene dichloride. The extracts were combined and evaporated to dryness under vacuum. The residue was recrystallized from methanol, and 2 mg. of crystals were obtained, which were identified as N-acetyl-N-desmethylvinblastine by infrared and ultraviolet analysis.

*Example 3*

N-desmethylvinblastine (25 mg.) was dissolved in 3 ml. of formic acid, and to the solution was added 0.5 ml. of acetic anhydride. The mixture was allowed to stand for 24 hours at room temperature and was then evaporated to dryness under vacuum. The residue was redissolved in 30 ml. of water and the aqueous solution was made alkaline with ammonium hydroxide and extracted three times with 20-ml. portions of methylene dichloride. The extracts were combined and evaporated to dryness under vacuum. The residue was recrystallized from methanol, yielding 12 mg. of pure, crystalline vincristine, which was converted to the crystalline sulfate. The product was identified by X-ray diffraction, infrared analysis, and thin-layer chromatography.

I claim:
1. N-desmethylvinblastine.
2. A method for the conversion of vincristine into N-desmethylvinblastine which comprises the steps of subjecting vincristine to prolonged exposure to elevated temperature at a pH in the range of about 1 to about 3, and recovering the N-desmethylvinblastine produced thereby.
3. The method of claim 2 in which the pH is in the range of about pH 1 to about pH 3 and the temperature is between about 75° C. and the reflux point of the solution.
4. The method of claim 2 wherein vincristine is treated at reflux in aqueous sulfuric acid at about pH 2 for a period of about 18 hours.

References Cited

UNITED STATES PATENTS 3,203,220   9/1965   Svoboda et al. _____ 260—236

ALEX MAZEL, *Primary Examiner.*

D. DAUS, *Assistant Examiner.*